United States Patent
Bjarnason et al.

(10) Patent No.: US 9,391,959 B2
(45) Date of Patent: Jul. 12, 2016

(54) AUTOMATED CONTROL PLANE FOR LIMITED USER DESTRUCTION

(71) Applicant: Cisco Technology, Inc., San Jose, CA (US)

(72) Inventors: Steinthor Bjarnason, Akershus (NO); Michael Behringer, Mougins (FR); Yves Hertoghs, Brabant (BE); Toerless Eckert, Milpitas, CA (US); Balaji B. L., Karnataka (IN)

(73) Assignee: Cisco Technology, Inc., San Jose, CA (US)

(*) Notice: Subject to any disclaimer, the term of this patent is extended or adjusted under 35 U.S.C. 154(b) by 423 days.

(21) Appl. No.: 13/742,071

(22) Filed: Jan. 15, 2013

(65) Prior Publication Data

US 2014/0201516 A1    Jul. 17, 2014

(51) Int. Cl.
- *H04L 29/06* (2006.01)
- *H04L 12/715* (2013.01)
- *H04L 12/24* (2006.01)

(52) U.S. Cl.
CPC ............ H04L 63/04 (2013.01); H04L 41/0806 (2013.01); H04L 41/28 (2013.01); H04L 45/64 (2013.01); H04L 63/0428 (2013.01)

(58) Field of Classification Search
CPC ............... H04L 29/06823; H04L 29/08027; H04L 29/12839; H04L 61/6022; H04L 63/10; H04L 12/2461; H04L 63/04; H04L 41/28; H04L 41/0806; H04L 45/64; H04L 63/0428; G06F 13/362; G06F 21/604; G06F 2221/2113
USPC .......... 726/2–4, 10, 14, 27–30; 713/150–151, 713/156
See application file for complete search history.

(56) References Cited

U.S. PATENT DOCUMENTS

| | | | |
|---|---|---|---|
| 7,451,305 B1 | 11/2008 | Pritikin | |
| 8,095,788 B2 | 1/2012 | Vilhuber et al. | |
| 2005/0050136 A1* | 3/2005 | Golla | 709/200 |
| 2006/0092976 A1* | 5/2006 | Lakshman et al. | 370/469 |
| 2008/0049621 A1* | 2/2008 | McGuire et al. | 370/236.2 |
| 2009/0263129 A1* | 10/2009 | Draer et al. | 398/51 |
| 2010/0306352 A1 | 12/2010 | Pritikin et al. | |
| 2012/0051321 A1* | 3/2012 | De et al. | 370/331 |
| 2012/0167196 A1* | 6/2012 | Colar et al. | 726/15 |
| 2012/0179831 A1* | 7/2012 | Brousseau et al. | 709/228 |
| 2013/0332724 A1* | 12/2013 | Walters | 713/153 |
| 2014/0192808 A1* | 7/2014 | Thubert | H04L 45/74 370/392 |

FOREIGN PATENT DOCUMENTS

| | | |
|---|---|---|
| EP | 1511238 A2 | 3/2005 |
| EP | 1653687 A1 | 5/2006 |
| WO | WO2006070197 A2 | 7/2006 |

OTHER PUBLICATIONS

U.S. Appl. No. 13/478,030, filed May 22, 2012.
U.S. Appl. No. 13/477,913, filed May 22, 2012.
(Continued)

*Primary Examiner* — Matthew Smithers
(74) *Attorney, Agent, or Firm* — Lempia Summerfield Katz LLC

(57) ABSTRACT

To avoid user error and breaking operations, administration and management (OAM), the control plane for implementing OAM is automatically generated by network devices without user input. This control plane is hidden from the user, preventing any configuration that may bring down the connectivity for OAM.

20 Claims, 3 Drawing Sheets

(56) References Cited

OTHER PUBLICATIONS

"IEEE 802.1X," webpage, Wikipedia, http://en.wikipedia.org/wiki/IEEE_802.1X, pp. 1-7, May 22, 2012.
"IEEE 802.1X-2004—Port Based Network Access Control," webpage, http://www.ieee802.org/1/pages/802.1x-2004.html, pp. 1-3, May 22, 2012.
"Secure Neighbor Discovery Protocol," webpage, Wikipedia, http://en.wikipedia.org/wiki/Secure_Neighbor_Discovery_Protocol, pp. 1-2, May 22, 2012.
"Neighbor Discovery for IP version (IPv6)," webpage, http://tools.ietf.org/html/rfc4861, pp. 1-97, May 22, 2012.
"Cisco Discovery Protocol," webpage, Wikipedia, http://en.wikipedia.org/wiki/Cisco_Discovery_Protocol, p. 1, May 22, 2012.
"Link Layer Discovery Protocol," webpage, Wikipedia, http://en.wikipedia.org/wiki/Link_Layer_Discovery_Protocol, pp. 1-3, May 22, 2012.
"Routing Protocol Security Requirements (rpsec) (concluded WG)," webpage, http://datatracker,ietf.org/wg/rpsec/charter/, pp. 1-2, May 22, 2012.
"Neighbor Router Authentication: Overview Guidelines," webpages, Cisco IOS Security Configuration Guide, http://www.cisco.com/en/US/docs/ios/12_2/security/configuration/guide/scfroutr.html, pp. 1-5, May 22, 2012.
"The Public Key Infrastructure Approach to Security," Oracle9i Security Overview, Release 2 (9.2) Part No. A96582-01, © 2001-2002 Oracle Corporation, 8 pages; http://docs.oracle.com/cd/B10500_01/network.920/a96582/pki.htm.
Cisco Systems, Inc., "Unique Device Identifier Retrieval," © 2003-2006 Cisco Systems, Inc., 12 pages; http://www.cisco.com/en/US/docs/ios/12_3t/12_3t4/features/guide/gtpepudi.html.
Cisco, Understanding Cisco TrustSec, Revised Jun. 16, 2011, 10 pages; http://www.cisco.com/en/US/docs/switches/lan/trustsec/configuration/guide/arch_over.html.
Cooper, et al., "Internet X.509 Public Key Infrastructure Certificate and Certificate Revocation List (CRL) Profile," Network Working Group RFC 5280, May 2008, 166 pages; http://www.ietf.org/rfc/rfc5280.txt.
Interopnet Labs, "What is EAP-FAST?" InteropNet Labs Full Spectrum Security Initiative (May 2005), 1 page; http://www.opus1.com/nac/whitepapers-old/e-eapfast-Iv05.pdf.
International Search Report and Written Opinion from PCT Application No. PCT/US2014/011200, Jun. 6, 2014, WO.
International Preliminary Report on Patentability, from PCT/US2014/011200, Jul. 30, 2015, WO.

* cited by examiner

| Device Identity | Certificate | Valid | Timing | Discovery Method |
|---|---|---|---|---|
| X17.cisco.com | X.509.Cert | Valid | 1/1/11 11:11:11 | AN SEND |
| Y2.cisco.com | X.509.Cert | Valid | 1/1/11 11:11:15 | AN SEND |
| M.webex.com | SUDI | Valid | - | L2 Discovery |

US 9,391,959 B2

AUTOMATED CONTROL PLANE FOR LIMITED USER DESTRUCTION

TECHNICAL FIELD

This disclosure relates in general to the field of computer networks and, more particularly, to establishing a control plane for configuring a network.

BACKGROUND

Network devices are designed to interoperate with each other in networks to carry services. Networks are becoming increasingly more complex, both in terms of the diversity of hardware components as well as in the functionality of the operating systems. The increased complexity and sophisticated network management systems must be learned by human operators. From the view of a network operator, the operational expenditure to successfully run a network is increasing.

One source of increased complexity is configuration of the network and devices. When building networking infrastructure, each node is configured to communicate with other nodes and for the nodes to be reachable for operations, administration, and management (OAM) purposes. External attacks and operational mistakes may break OAM, such as a user configuring a router in a way that breaks network connectivity. Service providers may add clamshell security (e.g., harden the connectivity to the outside), but hardening from external attacks still leaves the network open to operational mistakes and is a complex exercise prone to mistakes that may also break necessary OAM connectivity. Internal hardening of the configuration on a network typically involves many different manual settings and processes, possibly resulting in bringing down the network due to operator mishaps. The OAM may be isolated from the normal network operations by a variety of ad-hoc mechanisms (e.g., additional L2-VLAN for OAM, separate virtual routing and forwarding (VRF), or use of a totally separate physical network for OAM purposes only). However, the isolated OAM may be brought down due to user misconfiguration. Transport networks, such as MPLS-TP, often have their own shoed individual OAM-control plane that provides a transport-network specific set of OAM functions, but does not include the whole list of common OAM functions and is not extensible. All of these mechanisms come with a variety of downsides, including requiring user training for configuration knowledge.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS

To avoid user error and breaking OAM, a virtual control plane for implementing OAM is automatically generated by network devices without user input. This control plane is hidden from the user, and/or any configuration that may bring down the connectivity for OAM is prevented.

While the control plane may be automatically created and protected in any network, such automated configuration is used, in one embodiment, in autonomic networking. The autonomic network generates one or more adhoc networks with one or more default configurations that are accepted by the nodes of the network. Within the adhoc network, a virtual control plane is generated. The control plane fixes itself independently of the administration operation. The control plane is used as a management overlay to reach each component in the network, before or after any routing protocol is configured.

Hiding configuration details for the control plane from the operator and the network management system may simplify operations. The intelligence of networking is provided on the network devices. Autonomic networking relies on the components themselves, and greatly simplifies the interface to the operator and network management system. The intelligence used in the components provides the relevant best practices and keeps the network components up to date, without the need for human intervention.

Each network component self-manages in autonomic networks. Self-management includes, at least, self-configuration of a virtual network for OAM. An autonomic system may also include self-optimization, self-healing, and self-protection for each network component. Autonomic networking may bootstrap a general network in addition to the virtual network for OAM and/or may cover the entire life-cycle of a network.

Figures 1, 3:
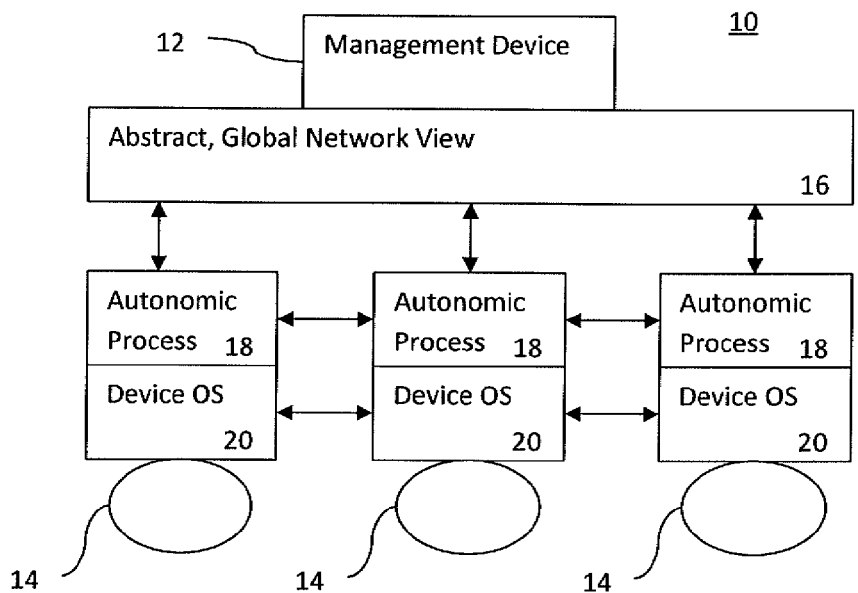
FIG. 1 is a simplified block diagram of an example autonomic network for establishing a configuration resistant control plane.
FIG. 3 illustrates an example trust table for determining devices to join a control plane.

FIG. 1 shows an example autonomic network 10 for creating a control plane for OAM and making the control plane immutable or preventing breaking of the control plane. Each network device 14 discovers the network 10 around itself and decides autonomically the appropriate behavior, such as the behavior for creating a control plane. As the network device learns new facts or receives input, the behavior may change. In one embodiment, the network devices 14 run their usual operating system 20 and still interact in the usual way on the operating system level, for example, performing routing protocols, spanning tree, or failover mechanisms run as in a traditional network. The autonomic process 18 runs on top of the normal operating system 20 using a northbound application programming interface (API) of the operating system 20. The autonomic process 18 may not define, for example, new routing protocols, but instead controls the way routing protocols are used. Essentially the autonomic process 18 configures the device 14 adaptively, changing due to the position in the network 10.

The autonomic process 18 determines what to configure and where. For example, the autonomic process 18 determines where to enable an interior routing protocol and/or on which interface to protect the network 10 against attacks. To adapt to the network 10 for configuring, the autonomic processes 18 communicate between various network devices 14. The domain identity (e.g., "router17.bank.com") along with a certificate is used to establish trust levels on all interfaces. For example, if a neighbor device 14 belongs to the same domain, the autonomic process 18 starts routing on that interface.

Otherwise, the autonomic process 18 configures protective measures on that interface, so that this device 14 and the network 10 cannot be attacked.

Network devices 14 with an autonomic process 18 and a verifiable domain identity are able to automatically form the network 10, bring up default addressing and routing, secure the network 10 against attacks from the outside, and/or enable services, such as multicast. This configuration may be achieved without any information from an operator or without a network management system configuring the device. The control plane may be created and protected automatically as well.

Autonomic networking is a fundamentally de-centralized approach. An autonomic device 14 has default behavior in the absence of central control. For example, in the absence of global IP address information, the autonomic process 18 picks appropriate private address ranges to allow the network 10 to at least work locally. The network 10 may rely on central resources represented as the network management system 12. Other centralize resources may include authentication, authorization, accounting (AAA) servers, a certification authority and/or domain name system servers.

The network management system 12 may be used to alter the pre-defined default behavior. Such dependencies are minimized where possible and not needed to create and operate the network. If the central resource is not available, the autonomic device 14 has a fallback behavior defined that explains how to react in a constructive way. By preventing breaking of the control plane, the network 10 may be configured regardless of the use of a fallback.

Various types of OAM may be implemented in the autonomic network 10. The autonomic network 10 may support visibility tools and mechanisms, such as syslog and netflow. These OAM functions may be centralized in the network management system 12. Alternatively, visibility tools and any additional feedback mechanisms that correlate information are de-centralized by the autonomic process 18. Instead, the autonomic process 18 provides a message back to the network management system 12. This allows for single messages such as "link x is down", or "switch y must be replaced", as opposed to the dozens of syslogs an operator typically sees in such cases. This messaging uses the control plane for communications.

The autonomic network 10 foresees feedback loops. One implementation of feedback loops allows for "objection enablement:" an autonomic device 14 determines that some action may become necessary in the future. For example, an autonomic device 14 determines that a hardware component has an increasing error rate, and thus schedules to fail over to a peer device in a certain time. The operator is notified of this decision through the control plane with a message to the network management system 12. The operator has the opportunity to "object" to this decision, knowing that the status quo is preferable over the scheduled action. In the absence of an objection, the device 14 triggers the scheduled actions. A rollback functionality may also be used, especially when the time frame is too short for an operator to react.

As shown in FIG. 1, the autonomic process 18 runs on top of the existing operating system 20. The autonomic process 18 is separated into one or more protocols, which together form the autonomic behavior. The first protocol interaction an autonomic device 14 uses is adjacency discovery. Domain certificates are exchanged. In the absence of a domain identity, the first protocol enables bootstrapping. Each autonomic device 14 runs adjacency discovery on all interfaces, on layer 2 and/or on layer 3, to be able to bridge potential non-autonomic layer 2 devices. The results are entered into a database, which lists for each interface the identity of the neighbor. This database is then used by higher level protocols, such as a protocol for establishing the control plane. In alternative embodiments, protocol separation is not used.

Higher layer autonomic processes 18 associate a neighbor with a certain trust level, based on this database. One such process is to create a control plane for OAM. Autonomic neighbors create an automatically generated control plane for the devices 14 in the autonomic network 10. The user does not configure the network 10 for creating the control plane. An out-of-band control plane may be used to configure and manage networking devices 14 without having to do any pre-configuration. A message bus allows for messaging related to the autonomic network between trusted devices. Towards untrusted devices, the message bus is inaccessible, which allows for separation of the autonomic control plane. The control plane is used to broadcast intent (e.g., abstracted or general directions) through the network 10, to correlate event information between various points of the network, and/or for configuring the network devices 14.

The control plane is protected from user mishaps or error in configuration. The autonomic process 18 for creating and maintaining the control plane attempts to make the control plane indestructible to configuration changes. The control plane is resistant to misconfiguration, yet uses the same network devices 14 used for implementing the data processing of the network 10. Separate hardware is not needed for the control plane.

Figure 2:
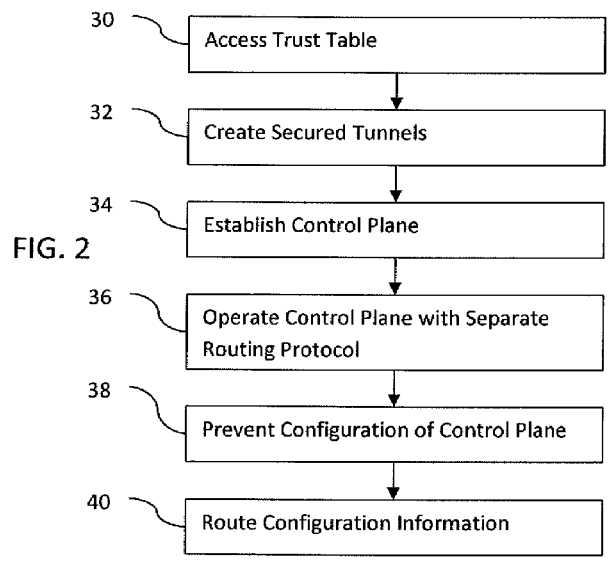
FIG. 2 is a flow chart diagram of one embodiment of a method for creating a configuration resistant control plane.

FIG. 2 shows a method for establishing a control plane with restrictions on changes to the control plane. The control plane is created automatically and without user configuration, such as created in an autonomic network. In alternative embodiments, the control plane is manually, at least in part, configured by the user initially, but then restrictions on changes are implemented.

Figure 4:
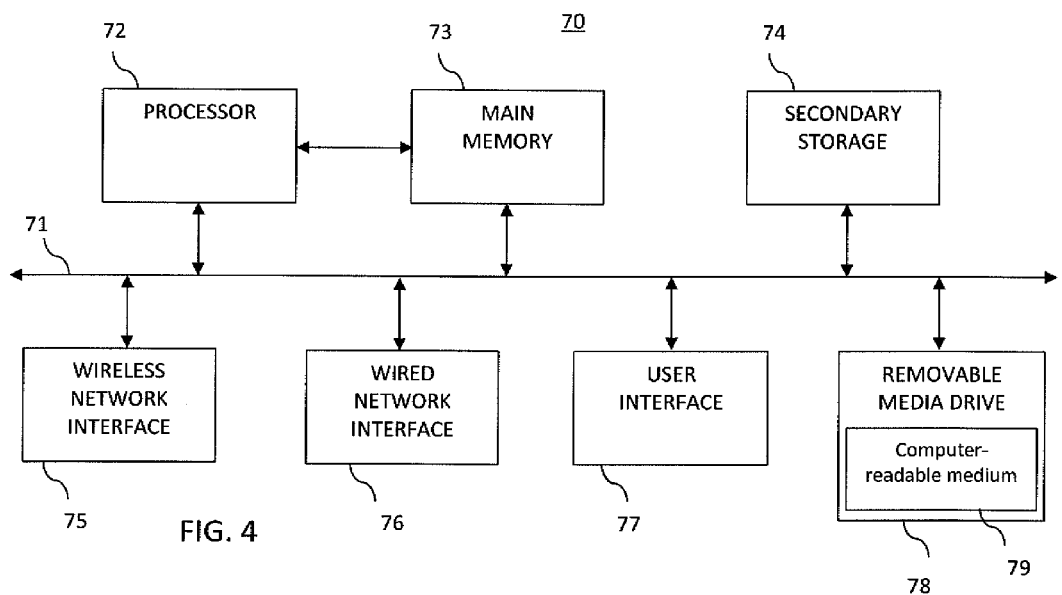
FIG. 4 is a block diagram of a network device, according to one embodiment, for use in an autonomic network with a device configured control plane.

The method is implemented by the network devices 14 of FIG. 1, the management system 12, the network device 70 of FIG. 4, or other devices. For example, the processor 70 performs or participates in acts 30-36 and 40, but the management system 12 implements act 38 with or without participation by the network devices 14. In an alternative embodiment, all of the acts 30-40 are implemented by the network devices 14 with or without requiring a separate management system 12 to implement.

Figure 5:
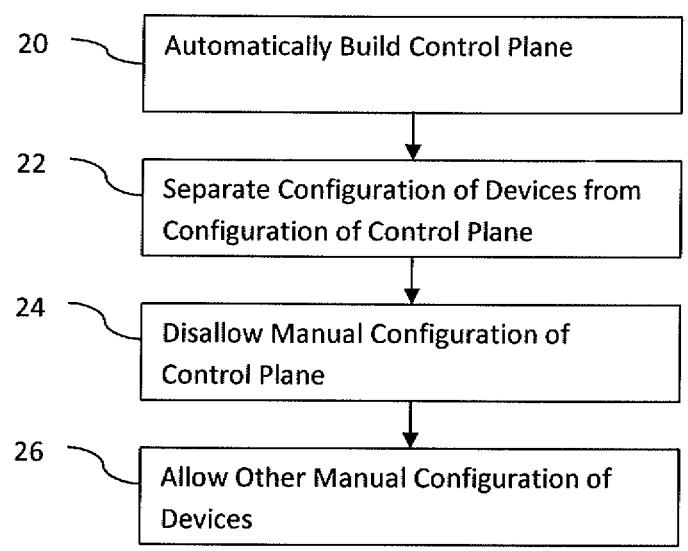
FIG. 5 is a flow chart diagram of an embodiment of a method for establishing a configuration resistant control plane by a network device or devices.

Additional, different, or fewer acts may be provided. For example, act 30 is not provided and certificate authentication is used instead. As another example, act 36 is not provided and a same routing protocol is used for both the control plane and routing other information. In another example, one or more acts of FIG. 5 are included. The acts are performed in the order shown or a different order.

The control plane automatically built between network devices is secure, separate and hidden from normal user configuration, cannot be de-configured or taken down by user configuration, and/or provides OAM plane access to the network devices 14 within a domain. The network devices 14 of the domain are either manually deployed with device credentials or access a trust table or corresponding collection of validity information. The entire process from initial bootstrap of a new network device 14 to building the control plane between authorized neighbors may be performed without any operator intervention.

In act 30, a trust table is accessed. A processor accesses information from memory about discovered neighbors. The table is in any format and contains any information. For example, the trust table indicates the credential validation and domain information for the devices 14. In alternative embodiments, pre-loaded certificates are used instead of a trust table.

The trust table is generated using credentials. For autonomic networks 10, the credentials may be added automatically. A new device 14 uses adjacency discovery to both announce it's presence on the network 10 and also receive information about other network devices 14. If a network device 14 which already belongs to a domain detects a new device 14 which does not belong to any domain, the belonging network device 14 pass on it's device credentials (e.g., unique device identifier (UDI) or secure unique device identifier (SUDI) (manufacturing certificate)) to the domain registration authority or autonomic network registration authority, ANRA. The ANRA decides using local information and/or policies and information from a central authority, if the new device 14 should be allowed to join the domain. If the ANRA decides to do so, a domain certificate is issued to the new device 14. The new device installs the domain certificate and then will use the domain certificate subsequently in adjacency discovery.

With the credentials available, trust information may be determined using the neighbor discovery. In the autonomic domain, the network devices 14 discover each other via autonomic neighbor-discovery and/or bootstrap protocols. Validation of credentials is included as part of neighbor discovery. The validation may be used to secure the control plane between trusted neighbors.

U.S. Published Patent Application No. 2013/0318570 (Ser. No. 13/477,913), the disclosure of which is incorporated herein by reference, shows some example embodiments for creating the trust table. In the autonomic network 10, security is used to establish the control plane. A cryptographically verifiable device and domain identity are used. To be able to distinguish "friendly" neighbors from "external" ones, each autonomic network device 14 has a cryptographically verifiable domain identity, for example "switch17.bank.com", with a corresponding certificate, signed by a domain certification authority. Each router, network management system (NMS) server, AAA server, or other network device 14 has a certificate with a common trust anchor. The router and AAA server may authenticate each other. For a secure shell (SSH) session, the router uses the domain certificate or SUDI to authenticate itself. User authentication uses the AAA server for authorization and audit reasons.

The network devices 14 may securely verify whether their neighbor belongs to the same domain, and consequently, whether the neighbor may be trusted for joining the control plane. While the domain certificate is used to bootstrap trust, the certificate is subsequently also used for other purposes where security is required, such as for establishing the control plane.

In one embodiment, neighbor discovery is used to create a generic trust database for other applications, including establishing the control plane. Each network device 14 uses neighbor discovery to discover its neighbors. During neighbor discovery, each network device 14 regularly sends out credentials to other network devices 14. The receiving network devices 14 perform classification and validation of the credentials of the neighboring network devices 14. The credentials and validation results are stored locally without having to perform a separate authentication for establishing the control plane. The trust database is created and maintained as a neighbor table with the results of the validation.

The generic trust database may then be consulted for establishing the control plane. The neighbor discovery may use any of various underlying protocols, but the resulting table unifies the results such that the control plane may be created for the appropriate network devices 14 without having to implement additional discovery. Both discovery and validation may be implemented locally without relying on centralized servers. Manual configuration may be avoided.

FIG. 3 shows an example trust table. For each neighbor device, the table includes entries for the neighbors identification (e.g., "router1.cisco.com"), where (e.g., port or interface) and/or when the neighbor device was discovered (e.g., "Fastethernet1/1", "12:37:33 01/01/12"), the discovery method (e.g., "Autonomic SEND"), the credentials (e.g., X.509 certificate) and the results of the validation of these credentials (e.g., "Certificate valid", "CRL check passed"). The neighbor identification may include the host name and domain name of the device. Any possible discovery method may be identified, such as manual, L3 discovery, L2 discovery, or CDP. Any possible credentials may be identified, such as an X.509 certificate, a SUDI, or <empty>.

Other information reflective of trust may be stored. For example, the table includes the information about the neighbor (e.g., domain and identity), the received credentials (e.g., X.509 certificate), and the results of the validation. As another example, the method by which the validation information is obtained is stored. Other information may be provided, such as the use of a nounce, secure UDI, unsecure UDI, password, call or not to a remote verification server, check for revocation or not, or manufacturer of the device. Less or different types of information may be included in the trust table. Additional, different, or fewer values or options for each type of information may be provided.

The trust table is accessed to determine which network devices 14 to include in the control plane. Any criteria may be used. For example, only network devices 14 that are members of a same domain are included. As another example, network devices 14 with sufficient trust or level of security are included. Combinations of criteria may be used, such as the domain and trust.

In act 32, the control plane is started by creating secured tunnels between the network devices 14 in the network 10. Neighboring autonomic network devices 14 automatically establish secure and reliable virtual point-to-point connections between each other. Using the local validation results, the autonomic control plane may be built between neighbor devices 14 of the same domain with current or validated domain credentials.

Any tunnel creation may be used. In one embodiment, GRE tunnels are created. In alternative implementations, IPinIP tunnels are created. Any technology which is used to separate traffic may be used (e.g., VLAN, or MPLS). The tunnel is virtual, so shares cabling used for other purposes as well. Alternatively, the tunnel uses separate cabling and/or other hardware.

In one embodiment, IPv6 local link addresses are used. Network connectivity across routes in the control plane is created by using a default and/or unchangeable IPv6 routing setup. The IPv6 calls for fixed addressing. Alternatively, an unchangeable L2-only/STP based L2 end-to-end reachability is used, such as for a network 10 of L2-only products. Other unchangeable and/or fixed address connections may be used.

The virtual, point-to-point (p2p) connections between trusted neighbors are protected. The created tunnels are secured and optionally encrypted. For example, a generic routing encapsulation and/or IPsec connection is used. As another example, a VLAN/MACsec based connection is used. The trust information is created and used for Trustsec operations. If the neighbor devices 14 have valid credentials, 802.1AE or the Institute of Electronics and Electrical Engineers (IEEE) MACSec is enabled on the link between those two network devices 14.

The type of connection may depend on the hardware support. The trust table may indicate the hardware and/or software capabilities of the various network devices 14. Other encryption may be used. These virtual p2p connections are terminated in the control plane, such as in a virtual routing and forwarding (VRF) implemented for the control plane.

In act 34, the control plane is established. The secured tunnels between the network devices 14 are used for the control plane. The control plane is built between autonomic network devices 14. An automatically generated OAM or control and management plane is created for the network devices 14 in the autonomic network.

The control plane is a separate network within the autonomic network 10. For example, separate virtual routing and forwarding (VRF) is used to establish the control plane than the VRF used for other purposes. The secured tunnels are placed within this separate, virtual network. The secured tunnels terminate in the VRF. In alternative embodiments, sub-interfaces are used to create one or more secured tunnels within a given tunnel. A sub-interface is used for the control plane.

More than one control plane may be created. For example, multiple instances of VRF are used for different types of operation. Separate control planes for OAM of audio, video, and other data network processing may be generated. As another example, control planes with different protocols than VRF may be created. In alternative embodiment, only one control plane for a given domain or autonomic network 10 is created.

The control plane is established based on the domain of the network devices 14, the capabilities of the network devices 14, the type of transport for the network 10, and/or other considerations. Additional, different, or fewer criteria may be used.

In one embodiment, the control plane is limited to network devices 14 of the same domain. When a new neighbor is discovered, the validation results of the network device's 14 credentials are used to decide if the control plane should be established with the new neighbor. For example, the control plane may only be set up between neighbor devices 14 that belong to the same domain (e.g., those which have certificates issued from the same ANRA). In alternative embodiments, network devices 14 from different domains may be included in the control plane if the domain policy dictates so.

The capabilities of network devices 14 may include the version of the autonomic process 18. For autonomic networking, the adjacency protocol includes a protocol version. A version number is exchanged in the neighbor discovery process. The version number may be used to establish the control plane. Different control planes and/or skipping of network devices may be provided based on the version of the autonomic process. The version number may indicate a level of trust.

Other capabilities include the type of security or encryption supported, whether a device has a routing functionality, whether the device may act as a management station 12, whether the device 14 may act as an autonomic network registration authority (ANRA—a device that controls admission of new devices 14 to an autonomic domain and provides the new devices 14 with domain identities), and the type of autonomic control plane supported. Any of these or other capabilities may be used to determine whether or not a given network device 14 is to be included automatically in the control plane, what control plane to connect with the network device 14, and/or the role of the network device 14 in the control plane. For example, a network device 14 joins the control plane if in a same domain, supports autonomic networking, and has sufficient security capability (e.g., IPsec).

The capabilities of the network devices 14 may be established from the trust table, neighbor discovery, by inquiry, or by look-up. Other techniques to determine the capabilities may be used.

The type of transport may be used to establish the control plane. The type of transport may include Ethernet, serial link, or other types. The control plane may operate differently for different types of transport, such as using different types of security. Alternatively, the control plane is established only for some types of transport and not for others. The type of transport may be discovered by inquiry, measurement, look-up, or other technique.

The control plane is established between devices 14 with the same capability that are validated as trustworthy. Alternatively, devices with different capabilities, trust levels, and/or transport types are included in the control plane. In one embodiment, only trusted devices get access to the autonomic control plane. Any device that cannot identify itself correctly, including, for example, routers from other domains, PCs, or printers, is only able to interface the protocol that is used for neighbor discovery. This concept allows an automatic isolation of the autonomic control plane against outside attacks.

The creation of the tunnels and establishing of the control plane using the network formed by the tunnels occurs without user input. The control plane is generated autonomically only by physically connecting the network devices and powering them on. Configuration for the control plane is not needed once connected. The autonomic process 18 and/or any validation certificates may be provided in the network device 14 by manual loading prior to connection to the network. In alternative embodiments, user input may be used. An administrator may input information used for establishing the tunnels and/or the control plane. For example, the user inputs a value indicating the type of transport to use. As another example, the user configures the control plane initially but is then later prevented from altering the operation of the network in a way to change the configuration in act 38.

In act 36, the control plane is used to create the desired network. Routing begins to occur on the control plane. To use the control plane without user input for configuring the control plane, a routing protocol is created for the control plane. An internetwork operating system instance is created for the control plane. Since the control plane is a network created within a network, other routing and corresponding virtual routing and forwarding is implemented in the network 10 as well.

The internetwork operating system of the control plane uses lightweight routing. The lightweight routing is less processing intensive than routing for data over the network. For example, routing for low power and lossy networks (RPL) is used for the control plane. Other types of routing may be used for the control plane. Open shortest path first (OSPF) or other routing is performed for use of the network 10. In alternative embodiments, the same type of routing and corresponding virtual routing and forwarding are used for the control plane and other operations of the network 10.

The routing for the control plane may use unique names for the network devices 14. The names may be unique to the devices 14 and/or unique for the control plane. For example, IPv6 link local addresses are used for the control plane. The same or other addressing may be used for the network 10 in general. The control plane does not dictate how the global or general network virtual routing and forwarding operate. The control plane does not dictate how other virtual routing and forwarding for other networks within the network 10 operate. In alternative embodiments, the control plane configuration may dictate one or more aspects of the routing operations of the networks sharing the network hardware.

In act 38, the user is prevented from altering the control plane. With the control plane established in act 34 and communications initiated with routing on the control plane in act 36, the control plane is operable for performing OAM tasks for the network 10. To avoid shutting down the network 10, the control plane is made indestructible or at least resistant to configuration error. The user is prevented from altering the virtual routing and forwarding, the subinterfaces, the tunnels, and/or other aspect of the control plane. While changes may be made to the network 10 and corresponding network devices 14, changes that would alter the control plane are prevented or limited.

The control plane cannot be unconfigured. In one embodiment, the configuration of the control plane cannot be changed by the user. In other embodiments, user changes to the control plane configuration are allowed as long as the changes will not remove the control plane. Changing hardware or other settings of the network 10 may alter the control network. Such changes are prevented, at least where the autonomic process 18 cannot keep the control plane operable (e.g., cannot adjust to the changes).

One or more aspects of the control plane are set autonomically and cannot be set by the user or administrator. The control plane is kept separate from any device configuration. The control plane has no dependencies on the device configuration. The control plane is built in such manner that the control plane is secure and cannot be taken down by any manual configuration on the network devices 14. The control plane is a virtual out-of-band network which is always up.

To maintain the control plane, the secured tunnels used for the control plane are prevented from being broken. The tunnels may be altered, but the subinterfaces of the tunnel for the control plane are maintained. The user is prevented from changing the interface in a way that disconnects the network device 14 from the control plane. The control plane may be shifted to another interface. Alternatively, the user is prevented from changing the interface. The ports to administer the routers are always available because the control plane stays on even if the operator breaks the routing protocols (e.g., misconfigures or implements a bad update) or breaks the link (shutdown). The user is prevented from configuring the interface or may configure the interface only in ways that will not disable the control plane.

In one embodiment, the user is prevented from shutting down a local area network card hosting any of the secured tunnels. Since the control plane is virtualized, extra hardware is not needed for the control plane. To protect or secure the virtualized control plane, the user is prevented from changing settings to hardware that may break the secured tunnels of the control plane. A subinterface is kept active for the control plane even if the main interface is shut down. For example, on a point-to-point protocol (PPP) link, a parallel network control program (NCP) that is not IPv6CP is maintained for management.

Any device configuration that may alter the control plane may be shown to the user, but input changes may be prevented. The mechanism for change is disabled. User options may be removed or limited to avoid dependencies of the control plane on user configuration. For example, the user is prevented from changing addressing used by the control plane. By preventing the user from changing the IPv6 link local addresses, which are by default created on all IPv6 enabled interfaces, in conjunction with the overlay tunnel network running a lightweight routing protocol, the control plane may be secured. Where other addressing is used, the user may be prevented from altering any addresses relied on by the control plane. The user is locked out of addressing and/or the look-up table of unique names used by the tunnels and/or subinterfaces.

The user is prevented from reconfiguring and/or breaking the routing configuration of the control plane. The user cannot break the SSH/telnet/syslog or any other OAM actions via change of configuration. The user cannot alter the virtual routing and forwarding of the control plane. The virtual routing and forwarding of the control plane is hidden or protected by fixing the addresses.

In one embodiment, the control plane is separated from the device configuration by hiding the control plane. The virtual forwarding and routing of the control plane is hidden from the user. The network management system does not display programmable values or otherwise provide setting options in the user interface for the control plane and/or that would alter the control plane. The mechanism for configuring the control plane is not presented to the user. A separate virtual environment is used for OAM and hidden from any user configuration. For example, an internetwork operation system instance of the autonomic control plane provides a separate virtual routing and forwarding for which all command line interface (CLI) configuration is hidden from any operator actions, hidden in existence from the user, or both.

The resources of the control plane may be protected. In addition to making the control plane operator immutable, the control plane is made immutable on the resource side. A minimum level of resources is reserved for the control plane. The user is prevented from configuring the network devices 14 in a way that will result in a resource being below the minimum. For example, a dedicated bandwidth, CPU time, and/or memory resources are allocated in a deterministic and/or guaranteed fashion. In other embodiments, resources are not protected.

While the control plane is immutable or protected from user shut down, the user may use the control plane to configure the network devices 14 and network operation. The control plane allows the administrator to configure the network devices 14 without restricting what can be done other than changes that affect the control plane. The operator is free to enter his own configuration without any restrictions for configuring the general network, but at the same time unable to influence the control plane.

The control plane routes the configuration or other OAM information to the network devices 14. For example, the control plane routes information for configuring one or more interfaces of a network device 14. The interface is a different interface than used by the control plane or the configuration is for an aspect of the interface not relied on by the secured tunnel of the control plane. Preventing configuration of the control plane by the user does not impacts the user-visible and user-configurable functionality of the router, switches, or other types of network devices 14 for performing their intended network functions. For example, when used in a domain network, the operator may immediately reach all routers in the domain via the control plane. For the intended or general operation of the network, the user configures the network devices 14, including addressing, routing and the like. This configuration is as would be performed without the autonomic control plane.

In autonomic networking, the network devices 14 themselves may configure the overall operation of the network and themselves without further user input. The user may override this configuration as long as the override is not for the control plane.

Referring to FIG. 1, the network 10 includes two or more network devices 14. In one embodiment, the network 10 includes tens, hundreds, thousands or more of the network devices 14. "Network device" is meant to encompass any computing device or network element such as servers, routers, personal computers, mobile network elements, network appliances, switches, bridges, gateways, processors, load balancers, wireless LAN controllers, firewalls, management station, or any other suitable device, component, element, or object operable to affect or process electronic information in a network environment.

The network 10 may be for a single domain (e.g., cisco.com) or multiple domains (e.g., cisco.com and pepsi.com). For example, the network may be a wide area network, local area network, intranet, extranet, wireless local area network, virtual local area network, or combinations of networks for one or more companies. Any form of network may be provided, such as transport networks, enterprise, data center, or other wired or wireless network. The network 110 may be applicable across platforms, extensible, and/or adaptive to specific platform and/or technology requirements through link-negotiation of connectivity.

The network 10 may be relatively static, such as the same network devices 14 being provided over minutes, days, weeks, or years. Network devices 14 may be occasionally added or replaced. In other embodiments, the network 10 is dynamic, such as allowing network devices 14 to be added or removed frequently. For example, mobile network elements may connect or disconnect from the network 10 throughout a day.

The network devices 14 are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable and/or other links may be used. Corresponding interfaces are provided as the ports.

For communicating with each other, the network devices 14 perform neighbor discovery. Neighbors include direct neighbors, such as network devices 14 connected together by one hop or a single link. Neighbors may include indirect neighbors, such as network devices 14 connected together by more than one hop or over multiple links with one or more intervening network devices 14. The neighbors may be neighbors either on layer 2 (link layer) or on layer 3 (network layer).

The neighbor discovery is performed by each of the network devices 14. Each device transmits neighbor discovery packets. For example, each network device 14 broadcasts neighbor discovery packets periodically. The network devices 14, receiving the packets, may perform neighbor discovery for themselves. Each network device 14 determines its own neighbors from the packets transmitted from the neighbors.

The network devices 14 form the control plane with the discovered neighbors. The control plane is formed from secured tunnels. The control plane allows for OAM functions from an administrator for the network 10. To ease administration of the network, the control plane is maintained despite configuration by the administrator. The administrator is prevented from making any changes to the automatically created control plane.

The management device 12 may be the same or different type of device than one or more of the network devices 14. In an autonomic network, the management device 12 is made a part of the network 10 and control plane automatically. Alternatively, the user designates one or more network devices 14 to be the management device 12 as part of user configuration. In other embodiments, a separate management device 12 may not be specifically provided. Instead, the management device 12 is any of the devices 14 with which a user gains access for configuring.

The management device 12 uses the control plane to communicate OAM information. In one embodiment, the configuration or control information may be abstracted. Rather than specifically configuring a given network device 14, the management device 12 transmits a statement of intent or value of general operation of the network. For example, the intent is to provide maximum security. The network devices 14 interpret the intent and make specific changes or set the configuration accordingly. For example, the network devices 14 interpret the statement of maximum security to use IPsec for communications. Where IPsec is not supported, that node may not be used. In other embodiments, specific configuration or other OAM information is communicated over the control plane.

FIG. 4 is a simplified block diagram of an example network device 14, such as a general or special purpose computer. The example network apparatus or device 70 corresponds to network elements or computing devices that may be deployed in the network 10. The network device 70 includes software and/or hardware to perform any one or more of the activities or operations for creating and using a control plane while preventing loss of the control plane.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices 14. For example, the network device 70 may include another processor and/or not include the secondary storage 74 or removable media drive 78. Each network device 14 may include more or less components than other network devices 14.

The processor 72, which may also be referred to as a central processing unit (CPU), is any general or special-purpose processor capable of executing machine readable instructions and performing operations on data as instructed by the machine readable instructions. The main memory 73 may be directly accessible to processor 72 for accessing machine instructions and may be in the form of random access memory (RAM) or any type of dynamic storage (e.g., dynamic random access memory (DRAM)). The secondary storage 74 may be any nonvolatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The wireless and wired network interfaces 75 and 76 may be provided to enable electronic communication between the network device 70 and other network devices 14 via one or more networks. In one example, the wireless network interface 75 includes a wireless network controller (WNIC) with suitable transmitting and receiving components, such as transceivers, for wirelessly communicating within the network 10. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the network 10. The network device 70 may include any number of ports using any type of connection option.

A user interface 77 may be provided in none, some or all machines to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for voice recognition), buttons, and/or touch pad.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

One or more of the memories 73, 74, 79, or another memory stores the trust table information as a local database. In one embodiment, the neighbor device has an electronically stored credential (e.g., manufacturing installed credential) to provide a level of trust between the device and a manufacturing service. The credential enables the device to trust a manufacturer service and vice-versa. In one example embodiment, the manufacturing installed credential may be an Institute of Electrical and Electronics Engineers (IEEE) 801.1AR initial device identifier (IDevID), or any other similar instantiation. The manufacturing installed credential is also referred to herein as a secure unique device identifier (secure UDI or 'SUDI'). A UDI may include a product identifier (PID), a version identifier (VID), and/or a serial number (SN) of the new device. Either a secure UDI or an unsecured UDI may be used as or provide as part of the credential for the neighbor discovery package.

The results of the validity operations are stored. The storage is at the network device. The results of the validation or validations are stored locally at the device that received the credentials and performed the validation. Tables of trust information are created and stored at various network devices 14. The results may be stored remotely in other embodiments.

The processor 72 is configured to use the validity, trust, and/or other neighbor discovery information to participate in the control plane. Working with other network devices 14, the processor 72 of a given network device 14 creates a separate, out-of-band configuration network as the control plane for OAM functions. Secured tunnels are created between the appropriate (e.g., same domain and trusted) discovered neighbors. The configuration network is created as a virtual control and management network.

The processor 72 is configured to make any parts of the configuration network local to the processor 72 immutable to user control. The virtual routing and forwarding performed for the configuration network is prevented from being altered. The addressing used by the configuration network is fixed. Alternatively or additionally, the processor 72 is configured to not generate and/or pass on configuration instructions altering the configuration network at other network devices 14.

The processor 72 also performs functions of the data network, such as routing or serving information. Using a separate virtualization of the network, the processor 72 and the corresponding network device 14 operate the general network for the intended purpose. This general network and corresponding network devices 14, including the processor 72, may be configured by the user. The user configures the operation of the connected network devices 14 and corresponding processors 72. Alternatively, the general network as well as the configuration network are autonomically operated without user configuration. The user may override or alter the configuration of the general network, but not the configuration network. The configuration network is used to control, configure, administer, and manage the general network. The configuration of the general network and the network devices 14 is limited such that the configuration input does not alter the configuration network.

FIG. 5 illustrates operation of the processor 72 as part of a network device 14 or the specific management device 12. The processor 72 is configured to create and use the control and management plane. FIG. 5 also represents operation of a group of network devices 14 in general to form the control and management plane.

Additional, different, or fewer acts may be provided. The acts may be performed in the order shown or a different order.

In act 20, a secured control and management plane is automatically built. Using instructions stored on or accessed by the network device 14, the control and management plane is formed without manual configuration. Virtual routing and forwarding is assigned to secured tunnels.

For a user perspective, the routers or other network devices 14 are unboxed, positioned and connected. Once powered on, the network devices 14 automatically enroll in the autonomic network. For example, neighbor discovery is performed to identify trusted network devices 14. The trusted network devices 14 form the control and management plane without any human involvement in configuration of the operation of the network devices 14.

In act 22, the configuration of network components is separated from configuration of the control and management plane. The control and management plane is configured automatically. The control and management plane is configured automatically without dependencies on any manual configuration of the components of the network. One or more separate instances of virtual routing and forwarding are provided for the control and management plane. Using the same hardware and physical connections, the control and management plane is created as a virtual network using subinterfaces, fixed addresses, and/or secure tunnels.

In act 24, manual configuration or changes to the configuration of the control and management plane are disallowed. The control and network plane is protected, such as by not allowing specific settings of parameters and/or by not allowing any change in parameters that may reconfigure the control and network plane.

The protection is by limiting the presented options on the user interface. Any setting or parameter to be set that results in a change to the control and management plane is not presented or is hidden. For example, the command line interface for the virtual routing and forwarding of the control and management plane is hidden from the user interface. Alternatively, the user is not allowed to change such settings or parameters even if presented. The user is prevented from input that would remove and/or alter the control and management plane. When the operator changes the configuration on any of the routers or other network devices 14, the user cannot break network connectivity for the control and management plane. Accordingly, the user cannot shut down interfaces through which the operator (or some management process) connects to the router. Instead of physically shutting down interfaces, the interfaces are, by default, set up to permit the autonomic control and management plane to use the interface. External attackers injecting wrong routes or other forms of attack cannot break this OAM plane either due to these restrictions.

The control and management plane is operated as a separate, virtual network. Users may alter configuration of other virtual networks. In this sense, the autonomically created control and management plane is implemented as part of the autonomic process 18 that otherwise looks "down" to the rest of the device operating system 20, and the network device 14 itself.

In act 26, the control and management plane is used to allow manual configuration of the network components. So long as the manual configuration of the network components does not violate the disallowing of act 24, the change is implemented and/or attempted. Through authorized management interfaces (e.g., SSH tunnel with credentials from an external NMS), the operator may create Internet protocol (IP) level network connectivity to routers in the autonomic domain and perform normal OAM actions (e.g., SNMP, telnet, ssh, WSMA, netconf, syslog/traps, CLI/firmware download or others).

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
creating secured tunnels between devices in a network;
establishing a control plane with the secured tunnels with virtual routing and forwarding, the control plane being a separate network within the network;
wherein the creating and establishing occurs without user input;
operating the control plane with a routing protocol separate from routing in the network;
routing information for configuring the devices through the control plane; and
preventing alteration, by an administrator, of the virtual routing and forwarding.

2. The method of claim 1 wherein creating comprises creating with IPv6 link local addresses.

3. The method of claim 1 wherein creating comprises creating the secured tunnels as virtual point-to-point connections with encryption.

4. The method of claim 1 wherein establishing the control plane comprises placing the secured tunnels with the separate network such that the secured tunnels terminate in the virtual routing and forwarding.

5. The method of claim 1 wherein establishing comprises establishing as a function of capabilities of the devices and type of transport for the network.

6. The method of claim 1 wherein the creating and establishing occurs in response to connecting the devices together in a powered state.

7. The method of claim 1 wherein operating the control plane comprises operating the control plane with a lightweight routing protocol using less processing than the routing for the network.

8. The method of claim 1 wherein routing the information for configuring comprises routing operations, administration, and management information for the devices through the control plane.

9. The method of claim 1 wherein preventing comprises preventing breaking connectivity of the secured tunnels.

10. The method of claim 9 wherein routing comprises routing the information for configuring an interface of one of the devices, and wherein preventing breaking comprises maintaining a subinterface for the control plane despite the information for configuring the interface.

11. The method of claim 1 wherein preventing comprises preventing shutting down a local area network card hosting any of the secured tunnels.

12. The method of claim 1 wherein preventing comprise preventing a change in addressing used by the control plane.

13. The method of claim 1 wherein preventing comprises hiding the virtual forwarding and routing from the administrator.

14. The method of claim 1 further comprising:
accessing a table indicating credential validation and domain information for the devices; and performing the creating and establishing where the devices are of a same domain and validated and otherwise not performing the creating and establishing.

15. Logic encoded in one or more non-transitory computer-readable media that includes code for execution and when executed by a processor is operable to perform operations comprising:
 automatically building a secured control and management plane without manual configuration;
 separating configuration of network components from configuration of the control and management plane, where the network components are configurable manually;
 disallowing configuration of the control and management plane; and
 allowing manual configuration of the network components using the control and management plane where the manual configuration of the network components does not violate the disallowing.

16. The logic of claim 15 wherein separating comprises configuring the control and management plane without dependencies on the manual configuration of the network components.

17. The logic of claim 15 wherein automatically building comprises creating virtual routing and forwarding with secured tunnels for the control and management plane and wherein disallowing comprises hiding a command line interface for the virtual routing and forwarding from a user interface.

18. The logic of claim 15 wherein disallowing comprises preventing user input that would remove the control and management plane.

19. An apparatus comprising:
 a memory configured to store trust information about a first plurality of communicatively connected devices;
 a networking device configured to participate in a separate out-of-band configuration network including a second plurality of communicatively connected devices, based on the trust information and wherein any parts of the configuration network local to the processor are immutable to user control.

20. The apparatus of claim 19 wherein the configuration network is a virtual control and management network, wherein the memory and networking device are part of one of the connected devices, the one connected device being of a same domain as the other connected devices and autonomically joining the configuration network, and wherein the networking device is configured to operate pursuant to configuration input from a user for operation of the one connected device in a data network with the other connected devices where the configuration input does not alter the configuration network, the configuration input being communicated over the virtual control and management network.

* * * * *